United States Patent [19]

Harrington

[11] Patent Number: 5,319,346
[45] Date of Patent: Jun. 7, 1994

[54] CONVERSION FROM ODD TO NON-ZERO WINDING NUMBER SPECIFICATION USING AN EXTENDED FRAME BUFFER

[75] Inventor: Steven J. Harrington, Holley, N.Y.
[73] Assignee: Xerox Corporation, Stamford, Conn.
[21] Appl. No.: 951,370
[22] Filed: Sep. 25, 1992

Related U.S. Application Data

[63] Continuation of Ser. No. 574,143, Aug. 29, 1990, abandoned.

[51] Int. Cl.$^5$ .............................. G09G 1/14
[52] U.S. Cl. ..................... 340/133; 395/141
[58] Field of Search .............. 340/747, 723, 728, 744; 395/149, 141, 140; 345/136, 133, 112

[56] References Cited

U.S. PATENT DOCUMENTS

| | | | |
|---|---|---|---|
| 4,594,673 | 6/1986 | Holly | 340/729 |
| 4,625,289 | 11/1986 | Rockwood | 382/41 |
| 4,646,078 | 2/1987 | Knierim et al. | 340/750 |
| 4,697,178 | 9/1987 | Heckel | 340/723 |
| 4,815,009 | 3/1989 | Blatin | 340/747 |
| 4,897,805 | 1/1990 | Wang | 340/723 |
| 4,914,729 | 4/1990 | Omori et al. | 340/728 |
| 4,947,158 | 8/1990 | Kanno | 340/747 |
| 4,962,468 | 10/1990 | Beauregard et al. | 340/747 |
| 4,998,211 | 3/1991 | Hamada et al. | 340/747 |

Primary Examiner—Ulysses Weldon
Assistant Examiner—Doon Chow
Attorney, Agent, or Firm—Oliff & Berridge

[57] ABSTRACT

Conversion from odd to non-zero winding number convention for representation of polygons in a graphics system comprises entry of a polygon in a frame buffer using distinguished states. Special scanlines are determined and marked. Special scanlines are those of relative maxima and minima, and those bordering regions where the polygon touches itself. Each of the special scanlines is examined and entries for the polygon on a scanline are marked odd or even (down or up). The polygon is drawn for a second time. During this drawing, the distinguished state (temporary) entered on the first pass is replaced by a down or up state. The state entered is the current direction value, except for entries on special scanlines. For special scanlines the state entered is given by the marked entry in the frame buffer. This value also becomes the current direction value for subsequent entries.

4 Claims, 12 Drawing Sheets

REPRESENTATION OF A PIXEL WITH A DOWN STATE

REPRESENTATION OF A PIXEL WITH A DOWN AND TEMPORARY STATE

CONVERSION FROM ODD TO NON-ZERO WINDING NUMBER SPECIFICATION USING AN EXTENDED FRAME BUFFER

This is a continuation of application Ser. No. 07/574,143 filed Aug. 29, 1990, now abandoned.

CROSS-REFERENCE TO RELATED APPLICATION

Copending U.S. patent application Ser. No. 07/363,827, filed Jun. 9, 1989, entitled "Representation of Polygons Defined by Non-Zero Winding Numbers" is incorporated herein by reference.

BACKGROUND OF THE INVENTION

1. Field of the Invention

The present invention relates to the conversion from odd to non-zero winding number convention for the representation of polygons in a graphics system and, more particularly, to the conversion from odd to non-zero winding number convention using an extended frame buffer.

2. Description of the Related Art

Copending U.S. patent application Ser. No. 07/363,827 describes a frame-buffer extension which allows the representation of polygons defined by a non-zero winding number. The advantage of this approach is that the polygons can be represented by just their borders, and many polygons can be included in the frame buffer even if they overlap. Multiple shapes defined by boundaries and a non-zero winding number can co-exist in the frame buffer. Many objects can be entered at a cost proportional to their perimeters rather than their areas, as is the case for conventional methods. Filling of all interiors can be performed in a single step as the frame buffer is imaged. Defining polygons, however, by a non-zero winding number is unusual. Most graphics systems define polygon interiors by an odd winding number. Page-description languages, such as Interpress and PostScript, support both odd- and non-zero winding number definitions. Of course, the scheme proposed could be used with a new graphics system which supported only the non-zero winding number definition, but if it is to be useful in implementing more conventional systems, then a method for converting from the odd to non-zero winding number convention is needed.

The related art has disclosed graphics systems having the ability to represent polygonal areas.

U.S. Pat. No. 4,697,178 to Heckel discloses a graphics system which utilizes a scanline depth buffer algorithm to display a three-dimensional scene on a two-dimensional display device.

U.S. Pat. No. 4,646,078 to Knierim et al. discloses a graphics system with a frame buffer memory for rapid shading of predetermined shapes. The frame buffer has two sections, one for receiving image information and the other for receiving patterns used in filling the predetermined images.

U.S. Pat. No. 4,625,289 to Rockwood discloses an improved Z-buffer for use in a graphics system. An exhaustive sampling method employs a surface scan to fill the buffer and a coordinate testing means to eliminate hidden surfaces.

U.S. Pat. No. 4,594,673 to Holly discloses a hidden surface processor for interaction with a graphics system. A hidden surface algorithm assembles and stores ordered linked lists of data concerning the segments which form each scan line.

U.S. Pat. No. 4,815,009 to Blatin discloses an algorithm for filling an image outline wherein an odd winding number is used to describe a line. Two methods of filling a polygon are shown which use a non-zero winding number or an odd winding number.

U.S. Pat. No. 4,897,805 to Wang discloses a method and apparatus for reforming polygon fills wherein an algorithm is shown which allows complex polygon shapes to be more easily filled. When scanning a polygon, the algorithm determines whether a string of pixels between one intersected polygon edge and the next intersected polygon edge should be filled when multiple horizontal edges are encountered.

The related art provides no suggestion of a conversion method which could be utilized to convert the odd winding number convention to the non-zero winding number convention.

OBJECTS AND SUMMARY OF THE INVENTION

Accordingly, one object of the present invention is to provide conversion of the odd winding number convention to the non-zero winding number convention.

Another object of the present invention is to provide conversion of the odd winding number convention to the non-zero winding number convention without requiring elaborate evaluations of the polygonal edges.

A further object of the present invention is to provide conversion of the odd winding number convention to the non-zero winding number convention in an efficient manner.

To achieve the foregoing and other objects and advantages, and to overcome the shortcomings discussed above, conversion of the odd winding number convention to the non-zero winding number convention is provided wherein the polygon is entered in the frame buffer using distinguished states. Special scanlines of relative maxima and minima and bordering regions where the polygon touches itself are determined and marked. Each of the special scanlines is examined and entries for the polygon on a scanline are marked "odd" or "even". The polygon is drawn for a second time during which distinguished states entered initially are replaced by "down" or "up" states. The state entered is the current direction value, except for entries on special scanlines. For special scanlines, the state entered is given by the marked entry in the frame buffer. This value also becomes the current direction value for subsequent entries.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
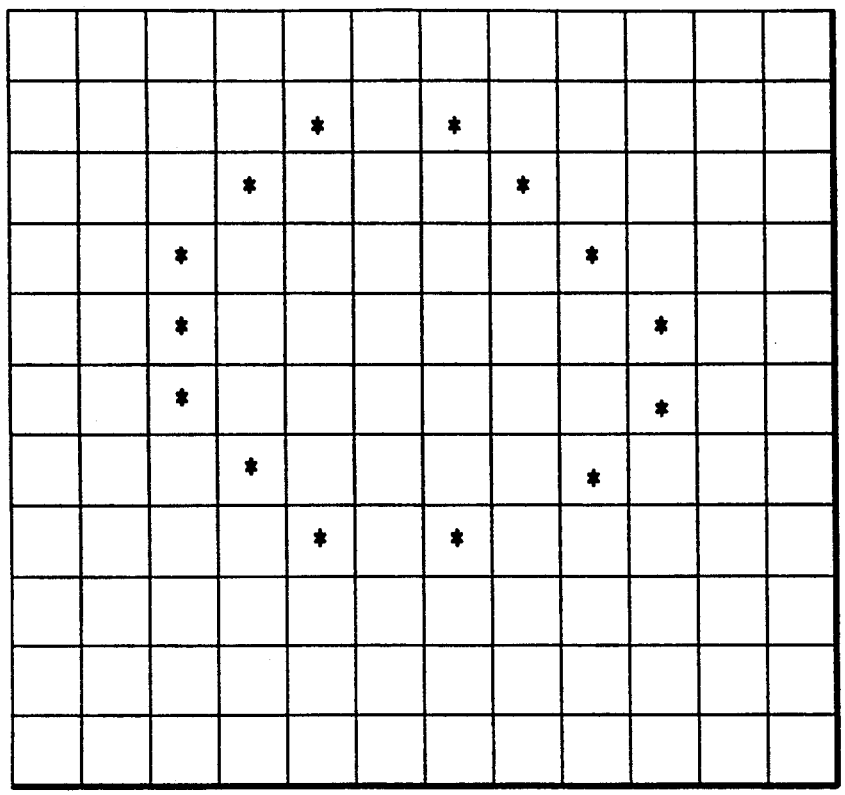
FIG. 1 illustrates frame buffer entries for the odd winding number convention.

Referring now to the drawings, a step-by-step description of the conversion from odd to non-zero winding number convention is now described.

FIG. 1 illustrates frame buffer entries for an odd winding number convention. A very simple approach to conversion will first be described. In an odd winding number system, a single polygon can be described by entering its left and right boundaries in a frame buffer using a single state to distinguish boundary from background.

To fill the polygon, all scanlines are stepped through, and for each scanline, the pixels from left to right are examined while shading. Start each scanline as exterior to the polygon, and whenever a boundary value is encountered, flip the shading state between exterior and interior.

Figure 2:
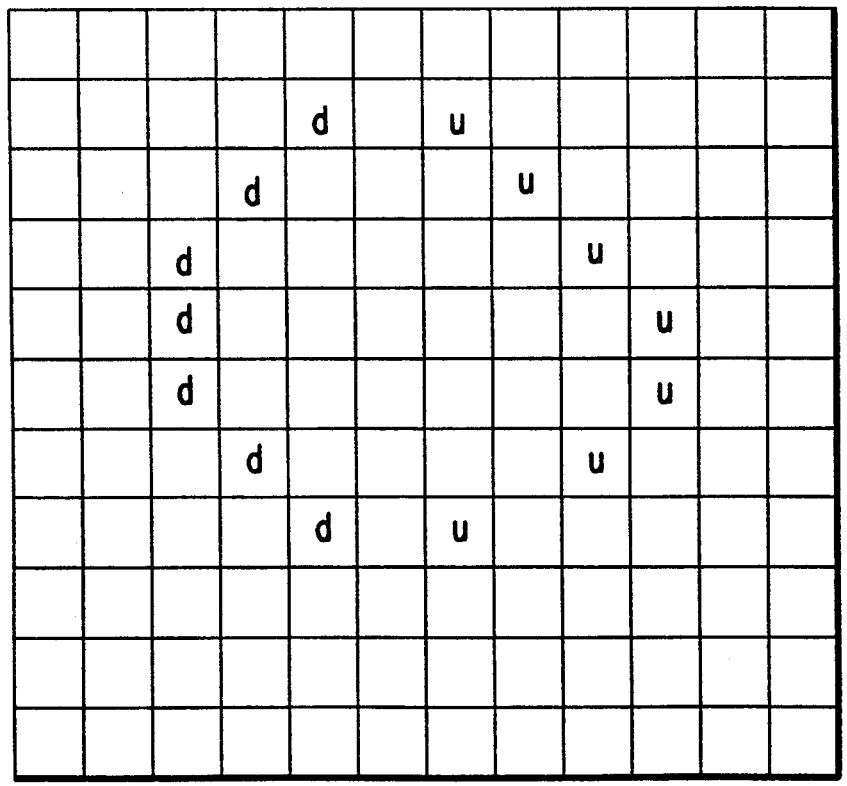
FIG. 2 illustrates frame buffer entries for the non-zero winding number convention.

As illustrated in FIG. 2, for the non-zero winding number definition of a polygon, the left and right boundaries are entered into the frame buffer using two states, one for downward drawn edges, and another for upward drawn edges. Again, the polygon is filled by stepping through all scanlines, and examining the pixels of each scanline from left to right while shading. The difference lies in how the interior points are determined. At the start of each scan, a counter for the winding number is set to 0. On each downward edge it is incremented, and on each upward edge it is decremented. Pixels for which the counter is non-zero are shaded as interior, and all others are shaded as exterior.

Figure 3:
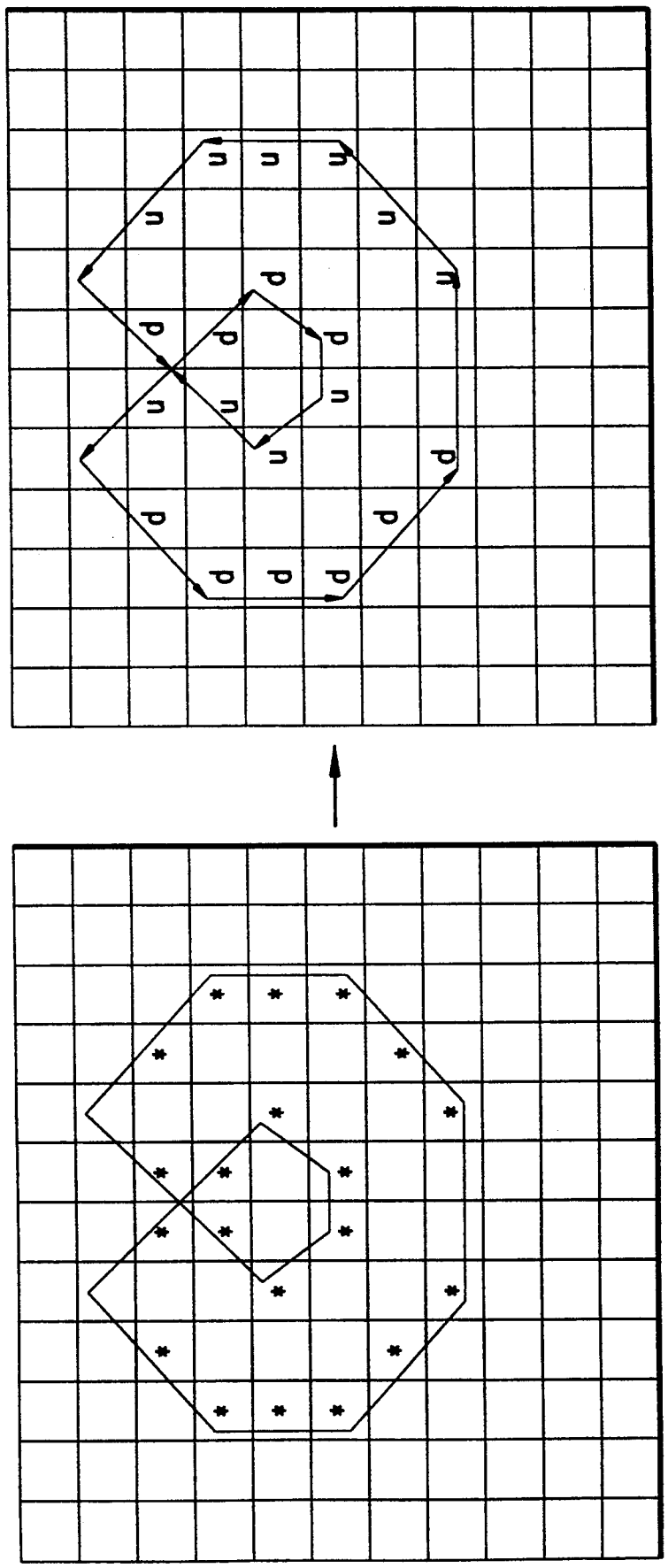
FIG. 3 illustrates conversion from the odd to non-zero winding number convention.
Figure 4:
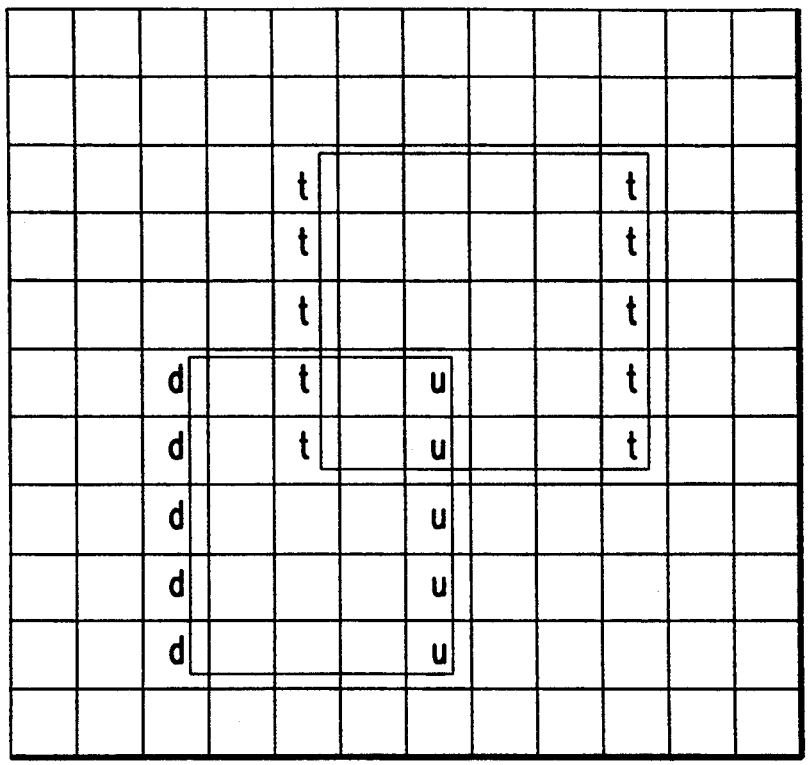
FIG. 4 illustrates entry of a polygon using a distinguished state.
Figure 5:
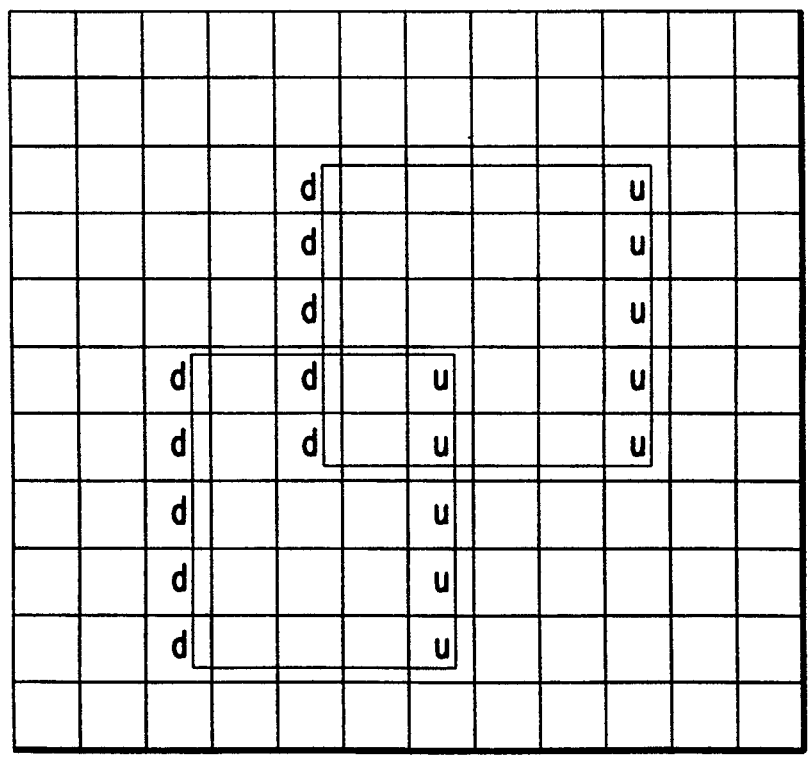
FIG. 5 illustrates replacement of the distinguished state.

As illustrated in FIG. 3, to convert from an odd to non-zero winding number, the odd boundaries are changed to the downward state, and even boundaries to the upward state. To do this, the left and right boundaries of the new polygon are first entered into the extended frame buffer using the temporary state. This distinguishes the new polygon's boundaries from any other polygons which were previously entered. FIG. 4 illustrates this with the addition of a simple rectangle to a frame buffer which already contains a rectangle.

Next, the scanlines, at least those affected by the new polygon, are stepped through. For each scanline, the pixels are examined from right to left. Whenever a "temporary" state is encountered, change it to either a "down" or "up" state. Change odd encounters (first, third, fifth, ...) to "down" and even encounters (second, fourth, sixth, ...) to "up".

While this is a simple scheme to perform the conversion, it is not very efficient. It requires the examination of the entire contents of every scanline touched by the polygon.

Figure 6:
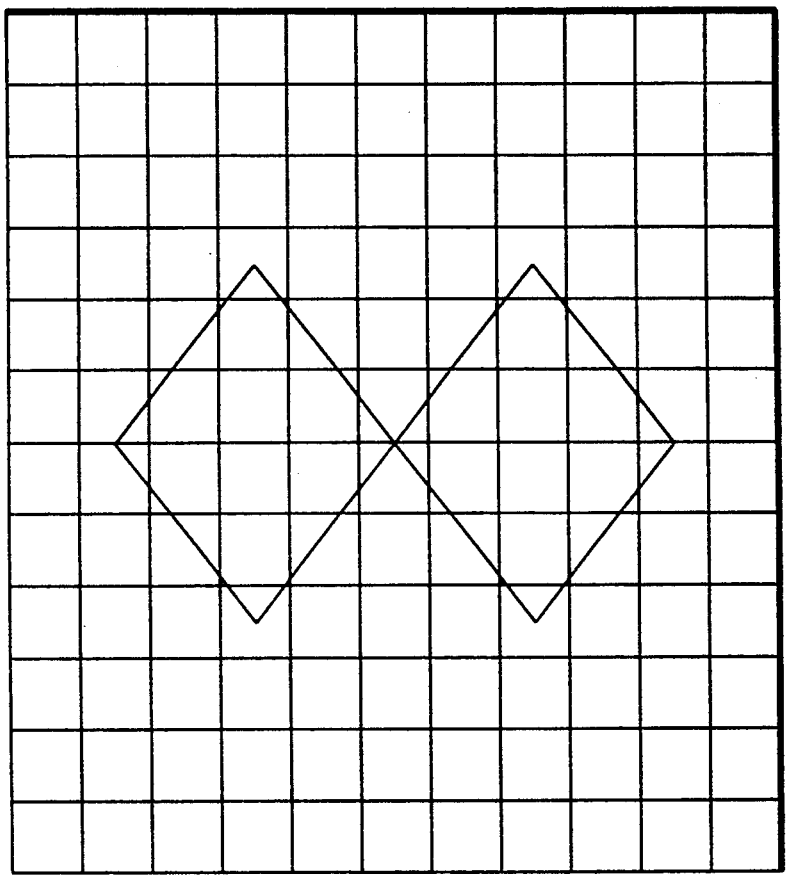
FIG. 6 illustrates conditions where special scanlines occur.

A description is now provided of a more efficient conversion operation. Along a boundary, the "up" or "down" state of a pixel is usually the same as the state of the previous pixel for the edge. There are only a few conditions where the state of the boundary changes between "up" and "down". These conditions are at relative maxima, minima, and self intersections illustrated in FIG. 6. When these points and the state at some starting point are known, the polygon could be drawn using the "down" and "up" states, flipping between them at the special points. But finding the intersecting points is extremely difficult, requiring knowledge of the precise behavior of the boundary. Instead, a more relaxed approach of finding where the curve might touch itself it provided.

The scanlines where there are relative maxima, relative minima, and where the polygon might touch itself are found. It is in the neighborhood of these scanlines that the state used for the boundary might change. Every pixel is examined on these select scanlines, and it is determined exactly what the boundary does. Instead of examining every scanline of the polygon, only those scanlines where a change of state might take place are examined.

The more efficient conversion from odd to non-zero winding number convention has three phases. In the first phase, special scanlines are determined and marked. Special scanlines are those of relative maxima and minima, and those bordering regions where the polygon touches itself. In the second phase, each of the special scanlines is examined, and entries for the polygon on a scanline are marked "odd" or "even" ("down" or "up"). In the third phase, the polygon is drawn for a second time. During this drawing, the distinguished state ("temporary") entered on the first pass is replaced by a "down" or "up" state. The state entered is the current direction value, except for entries on special scanlines. For special scanlines the state entered is given by the marked entry in the frame buffer. This value also becomes the current direction value for subsequent entries. Each of the phases will now be discussed in greater detail.

PHASE I

Figure 7:
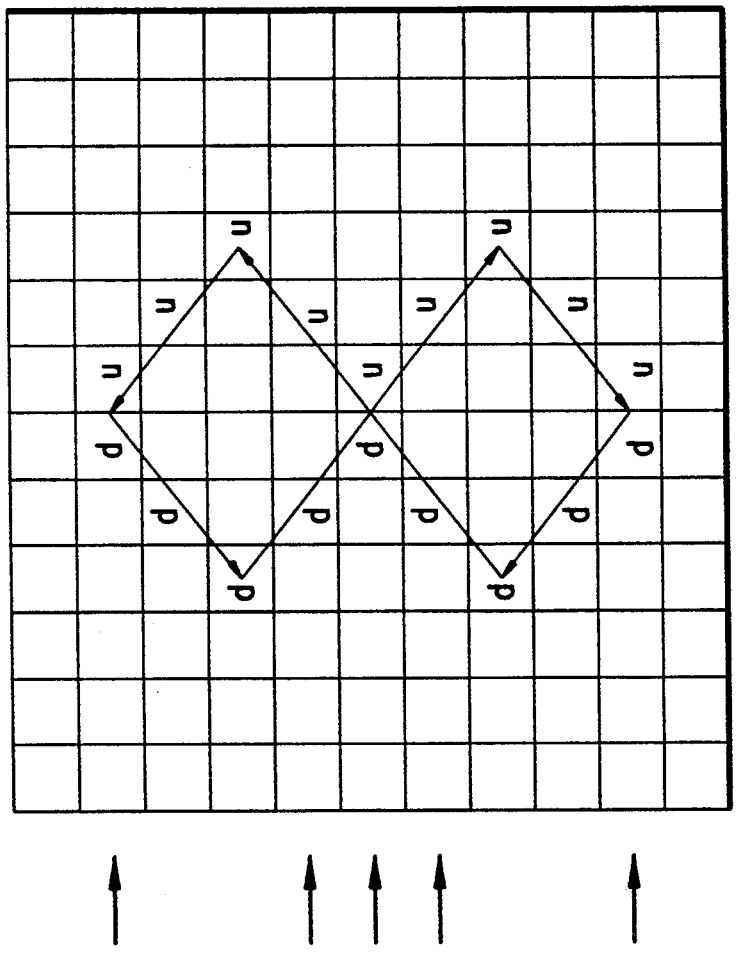
FIG. 7 illustrates special scanlines.

The first phase of the conversion finds special scanlines, i.e. the scanlines on which the direction value associated with the polygon's boundary may change. This is not the direction in which the original odd winding number polygon is drawn, but rather the direction in which an equivalent non-zero winding number polygon would be drawn. These special scanlines occur at relative maxima and minima (perpendicular to the scan direction), and near self-intersecting points as shown in FIG. 7.

The first point in the sequence of polygon edges can also give rise to a special scanline so as to give an initial orientation for the edges. The maxima and minima can be easily determined by keeping track of current direction as the polygon edges are traversed in sequence. Whenever the direction shifts between upward and downward, an extreme point has been reached. This technique can be applied to edges which are curves rather than line segments, provided the direction is checked on a pixel-by-pixel basis. Horizontal edges and runs of horizontal pixels do not alter the current direction. If the first point of polygon edge sequence always generates a special scanline, then the case of the first point lying on a maxima or minima is covered.

The problem of locating self-interesting points is more complex. The approach will be to actually enter the polygon into the frame buffer. Before each point is entered, the pixel is examined to see if it already contains a polygon edge. If so, the polygon has touched itself. Actually, entering the polygon boundary has several advantages. Once entered, the special scanlines can be examined to determine the parity of the edges, and thus the direction for the final polygon representation. It also means that no complex arithmetic or sorting is needed to find the points where the polygon touches itself. The approach generalizes to polygons with edges which are not line segments.

In this first phase, the polygon pixel entries must be made using some state other than the "up" or "down" states used for the final representation. This is to distinguish it from other polygons which may have previously been entered into the frame buffer. We shall call this state "temporary" to emphasize that it is a temporary representation of the polygon. We make one entry for each edge on each intersected scanline.

Figure 8:
FIG. 8 illustrates the exact representation of a pixel state.
Figure 8:
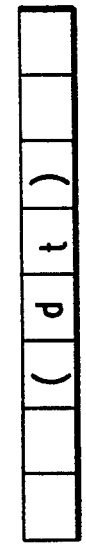

In copending U.S. patent application Ser. No. 07/363,827, it was described how several edges passing through the same point can be represented in the extended frame buffer. The method constructs lists of pixel values in the frame buffer as shown in FIG. 8. This method can be employed here to handle cases where the new polygon passes through the same pixel as a previously entered polygon (although other data representations are possible).

Figure 9:
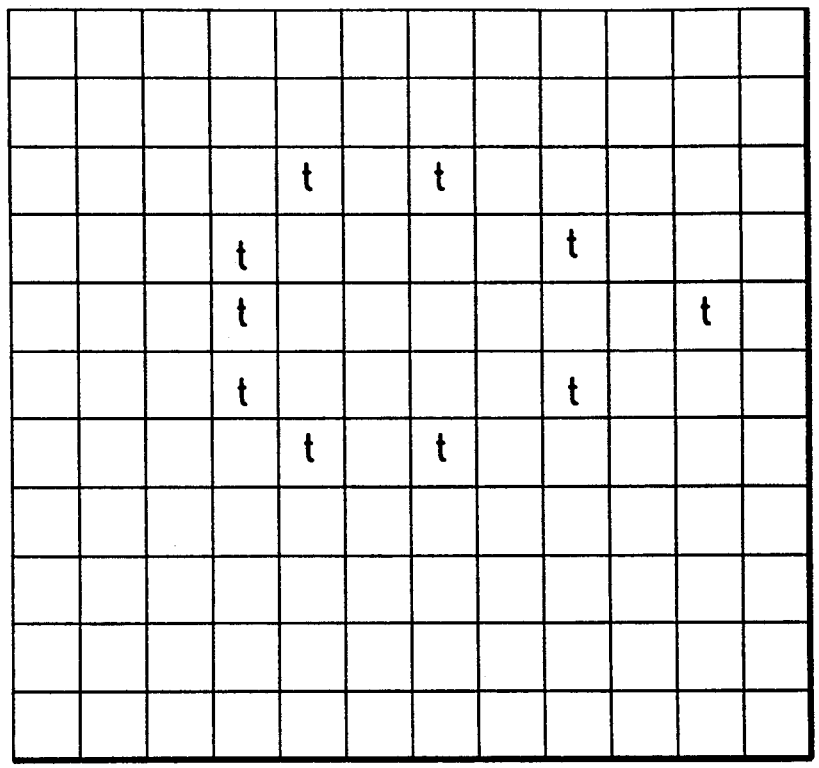
FIG. 9 illustrates entry of a single distinguished state per edge on a scanline.
Figure 10A:
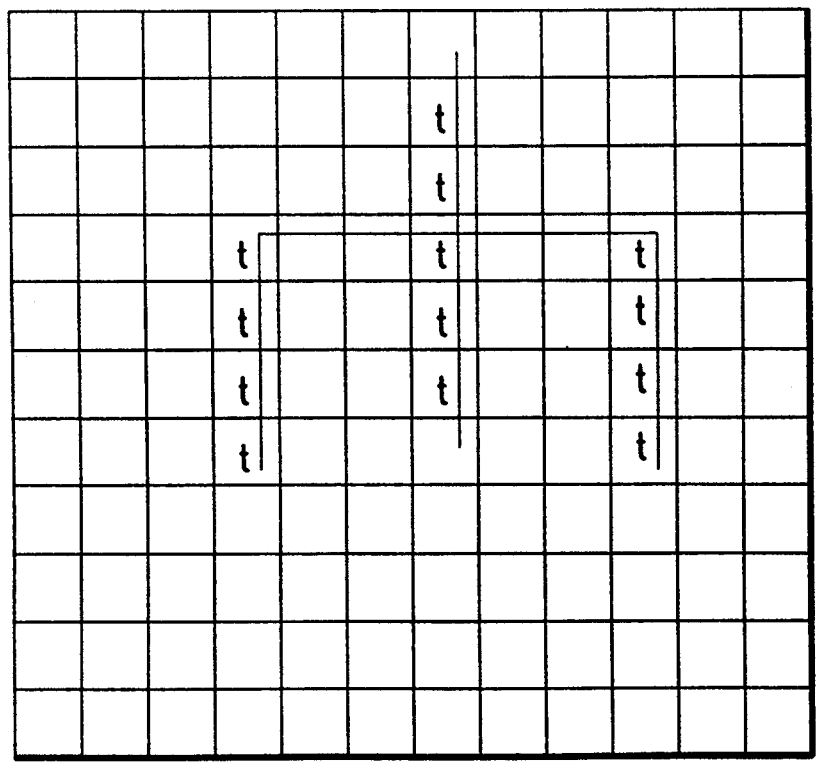
FIGS. 10a and 10b illustrate crossing edges without collision.
Figure 10B:
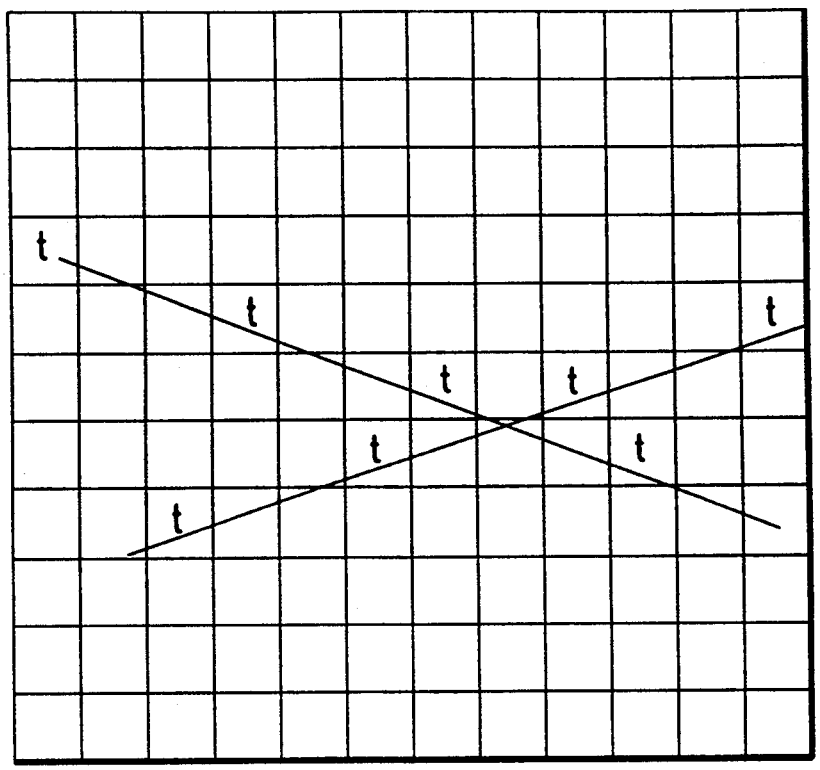

Entering only one "temporary" state per edge on a scanline as shown in FIG. 9 allows the "temporary" states to be used to calculate the parity of the edge. Pixels containing the "temporary" states will eventually become the boundaries for polygon filling. The "temporary" states will mark the left and right boundaries of the polygon. However, "temporary" states alone are not sufficient in determining scanlines where the polygon touches itself. Horizontal, or nearly horizontal edges can be crossed without collision of the temporary states as shown in FIGS. 10a and 10b.

Figure 11A:
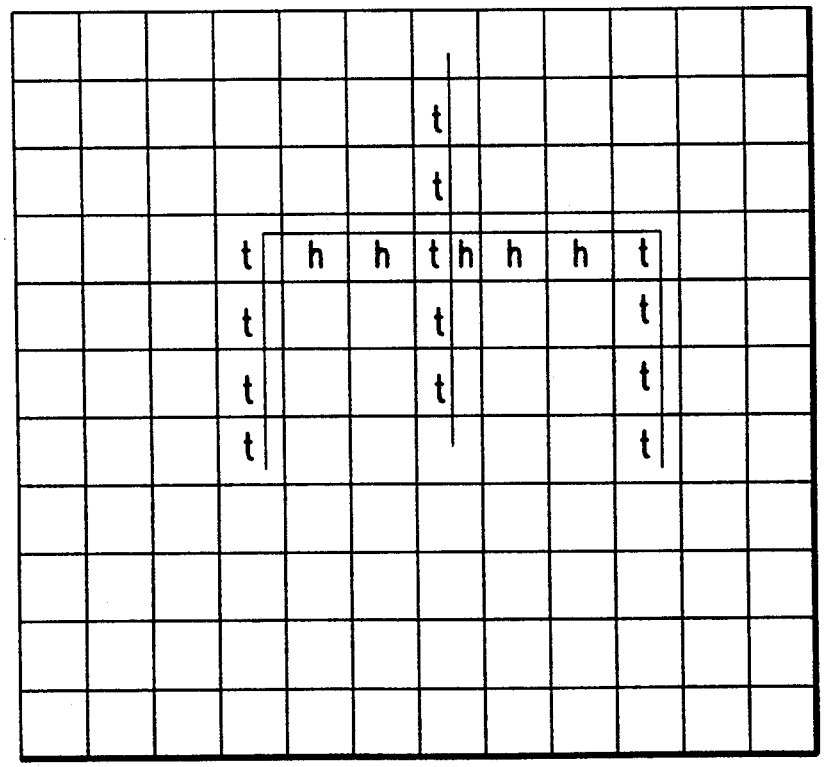
FIGS. 11a and 11b illustrate horizontal states which guarantee collision.
Figure 11B:
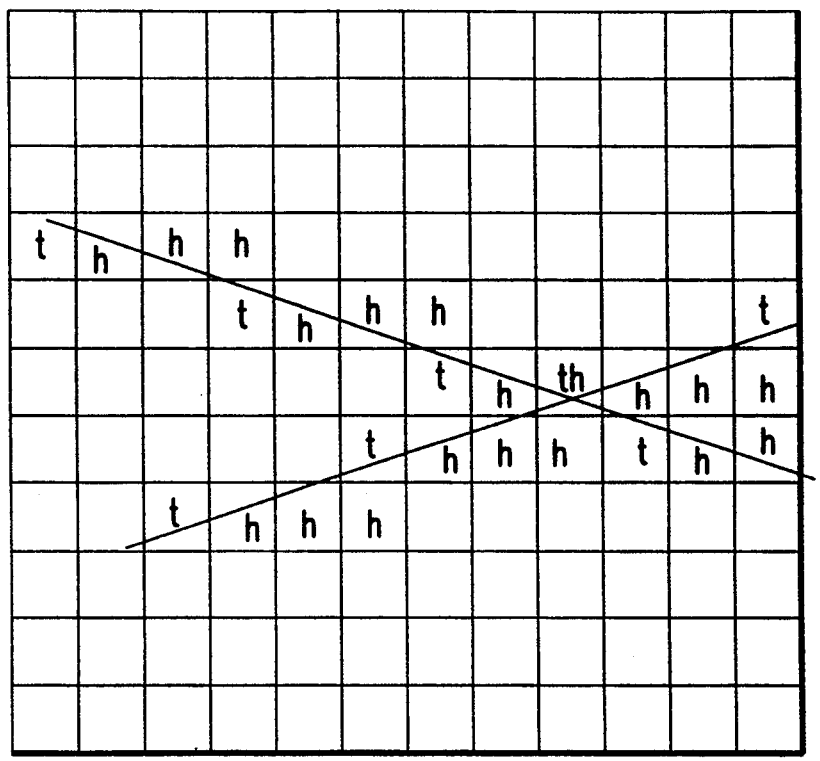

In order to easily locate the points where the polygon touches itself, as illustrated in FIGS. 11a and 11b, horizontal segments are filled in with another new state, "horizontal." Thus, the polygon will be drawn using a connected closed chain of marked pixels. If the polygon touches itself, then a "temporary" pixel state will collide with either another "temporary" pixel state or a "horizontal" pixel state.

Figure 12:
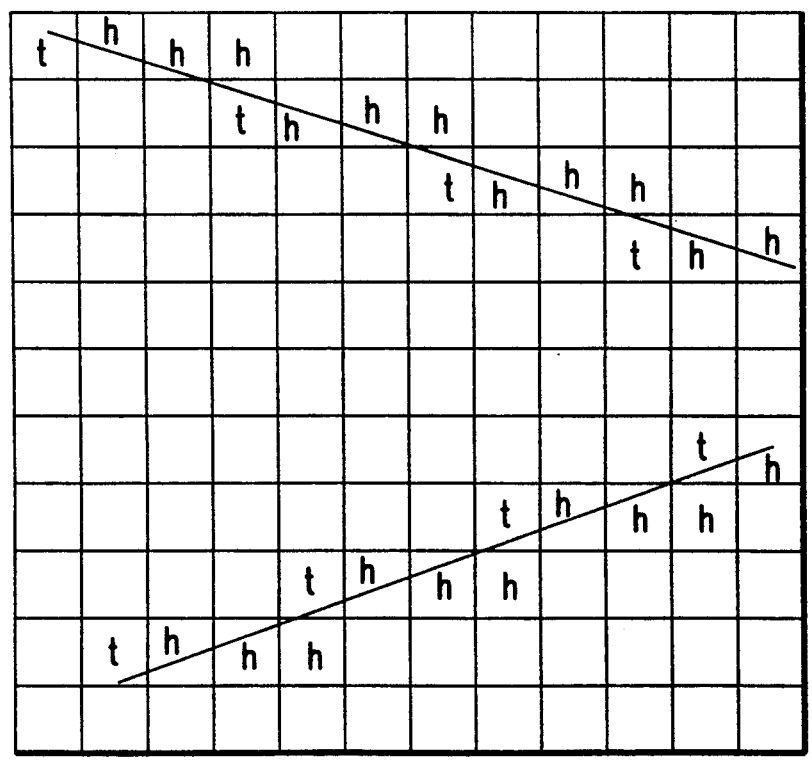
FIG. 12 illustrates the distinguished state at a leftmost pixel of a horizontal run.

Since the "horizontal" states serve only to indicate the presence of at least one polygon edge, and not which edge or how many edges there are, two colliding "horizontal" states simply result in a single "horizontal" state. Two "horizontal" states need never be bound to the same pixel. Likewise, a "horizontal" state need not be entered if the pixel already contains a "temporary" state, and entering a "temporary" state cancels any need for a "horizontal" state The convention that the "temporary" state is always the leftmost pixel of the horizontal run of pixels on a scanline for an edge has been chosen for purposes of this description as shown in FIG. 12. With this convention (or with "temporary" always the rightmost pixel), touching edges will always be indicated by collisions between "temporary" states or "temporary" and "horizontal" states. The horizontal states may collide as well, but these collisions need not be considered for identifying touches.

In summary, to find scanlines where the polygon may touch itself, each edge is drawn pixel-by-pixel; a "temporary" state is entered for the leftmost pixel on the scan through which the edge passes, and "horizontal" states are entered for the remaining pixels intersected by the edge. When placing the "temporary" state, the pixel if first examined to see if it already contains a "temporary" or "horizontal" state. If so, there is a touch at that scanline. If there is already a "horizontal" state, it may be replaced by the "temporary" state. When placing new "horizontal" states, each pixel is checked for the presence of a "temporary" state. If found, there is a touch at that scanline. If the pixel already contains either a "temporary" or a "horizontal" state, a second "horizontal" state need not be entered.

While this procedure identifies scanlines where edges touch, these are not the only special scanlines which should be noted. The scanlines which precede and follow the touched scanlines should also be noted as special. The touch points are noted because points of self-intersection are sought. These are points where the direction labeling of the edges may change from one scanline to the next. This change, however, may occur either on the touch scanline or on an adjacent scanline, depending on the specific nature of the intersection and direction in which it is approached in drawing the edge.

Figure 13A:
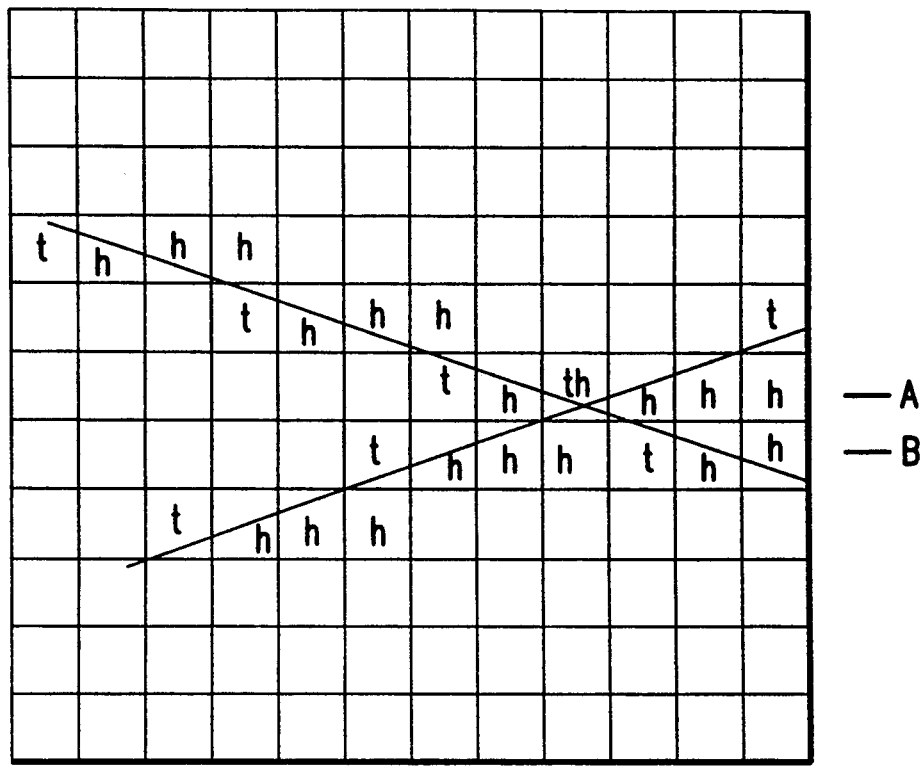
FIG. 13a and 13b illustrate direction changes between two scanlines.
Figure 13B:
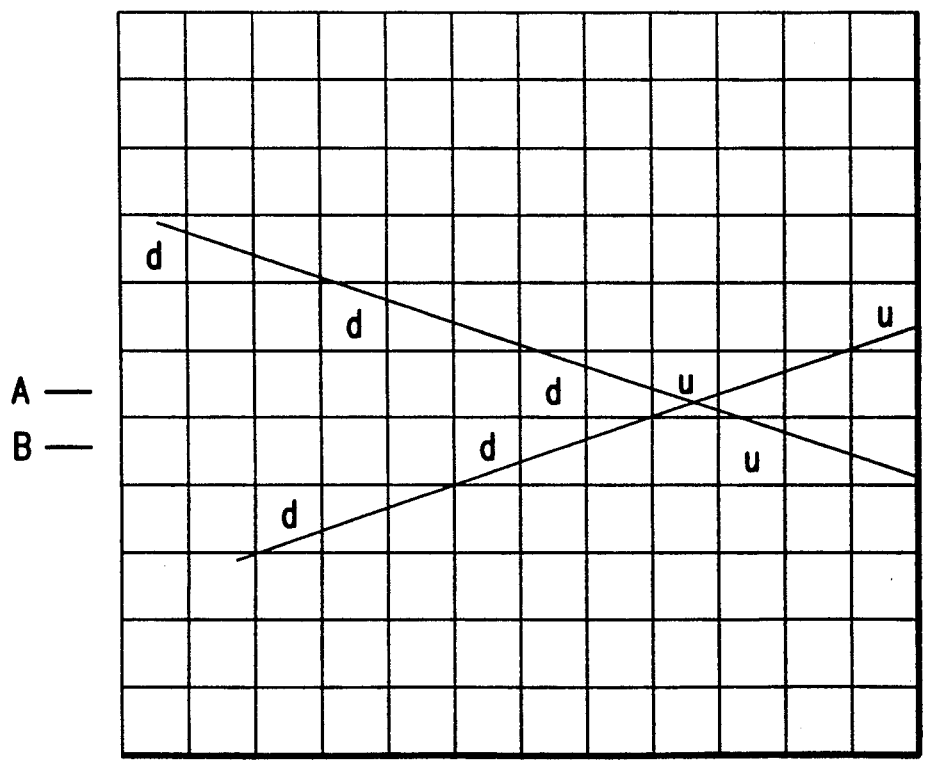
Figure 14A:
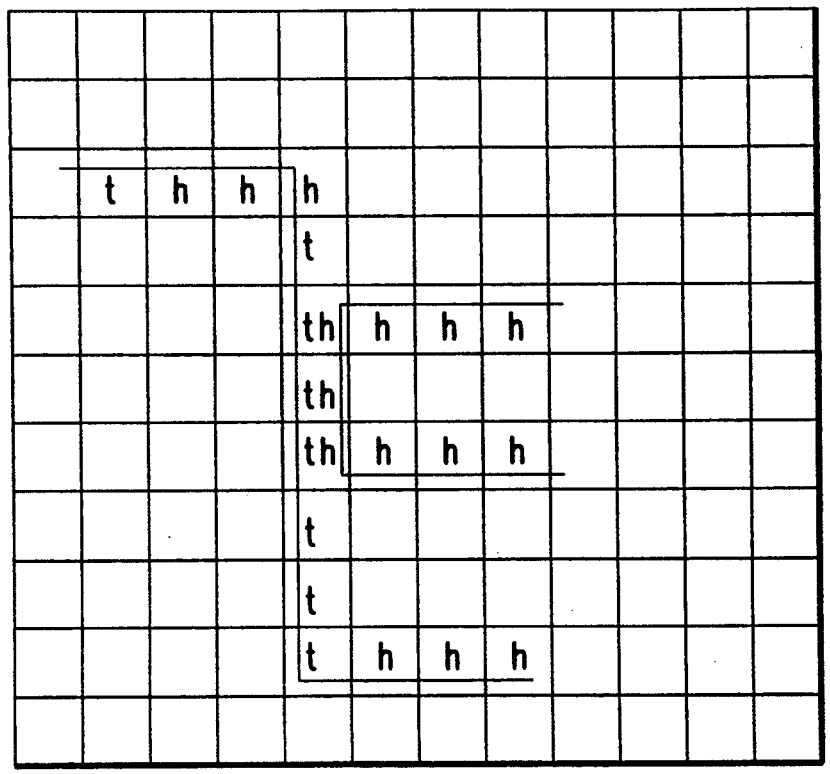
FIGS. 14a and 14b illustrate collisions which may or may not be attributed to overlapping edges.
Figure 14B:
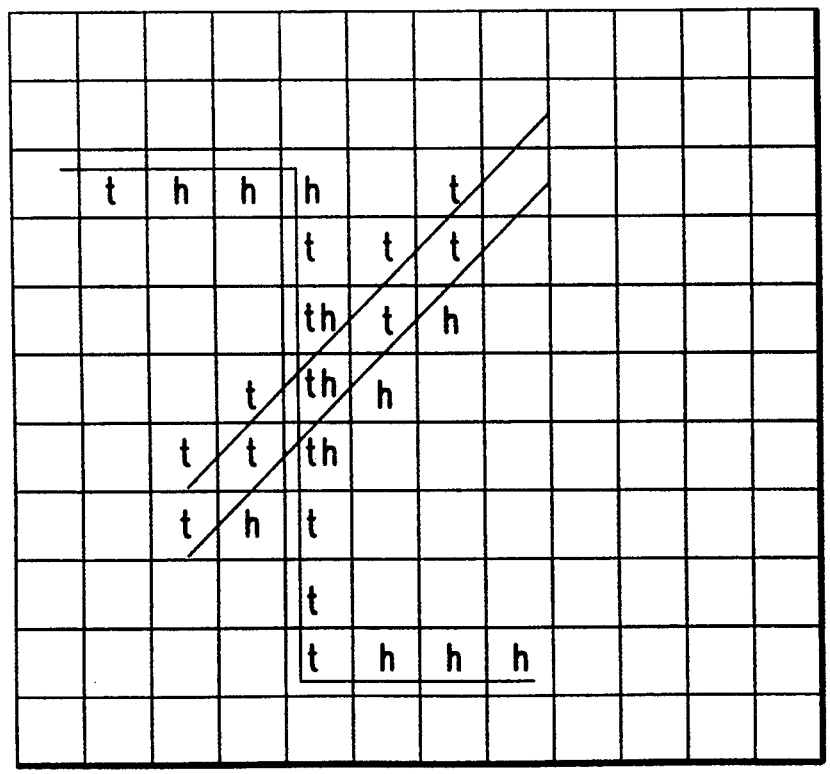

In FIG. 13, the direction values change between scanlines A and B. If an edge is drawn downward, then the value is known on scanline A (the touch scanline), but the new value on scanline B (the scanline following the touch) is needed. If an edge is drawn upward, the value on B is known, but the new value at the touch scanline A is needed. A case where the direction values on the scanline preceding the touch are needed can just as easily be presented. The special scanlines are the touch scanline, together with the preceding and following scanlines. If a touch occurs on a sequence of scanlines, such as when two edges overlap, all must be marked special. This is because we cannot distinguish between a series of touches arising from overlap, and a series arising from several nearby intersections as shown in FIG. 14a and 14b.

Figure 15:
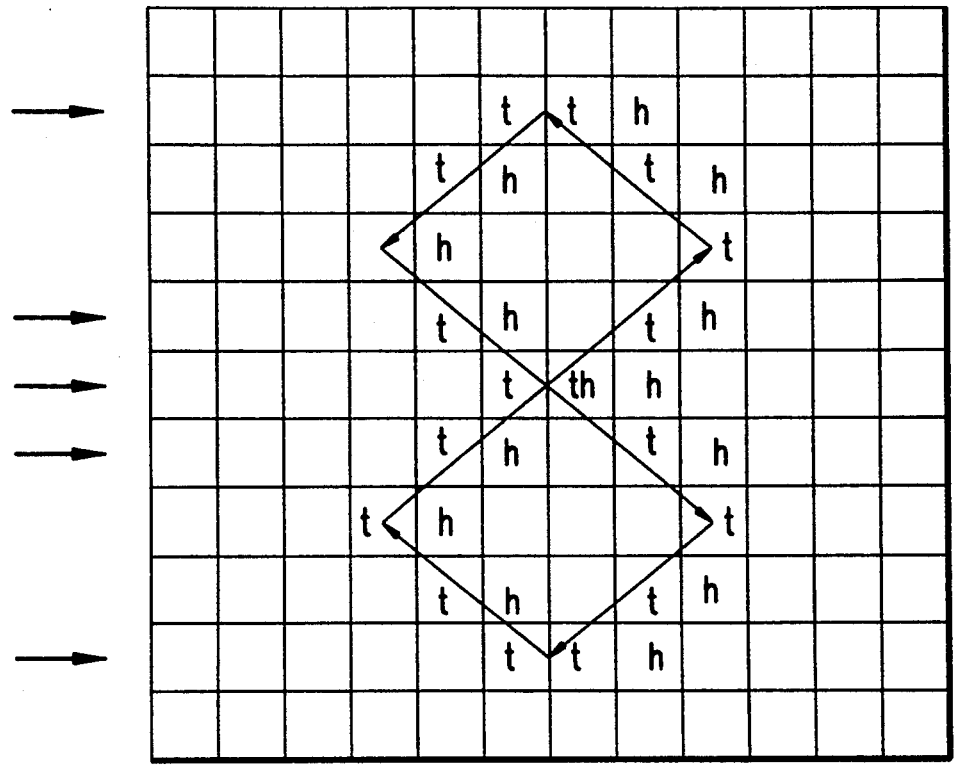
FIG. 15 illustrates edge entry and scanline marking.

In order to mark scanlines as special, the implementation uses an array of flags (one flag for each scanline). At the start of the polygon processing, all flags are initialized to false. Whenever a scanline is determined to be special, its corresponding flag is set to true. It is possible for a flag to be set several times, but the result is still a true setting. When all edges have been entered, and all special scanlines marked, phase I processing is complete as shown in FIG. 15.

PHASE II

Figure 16:
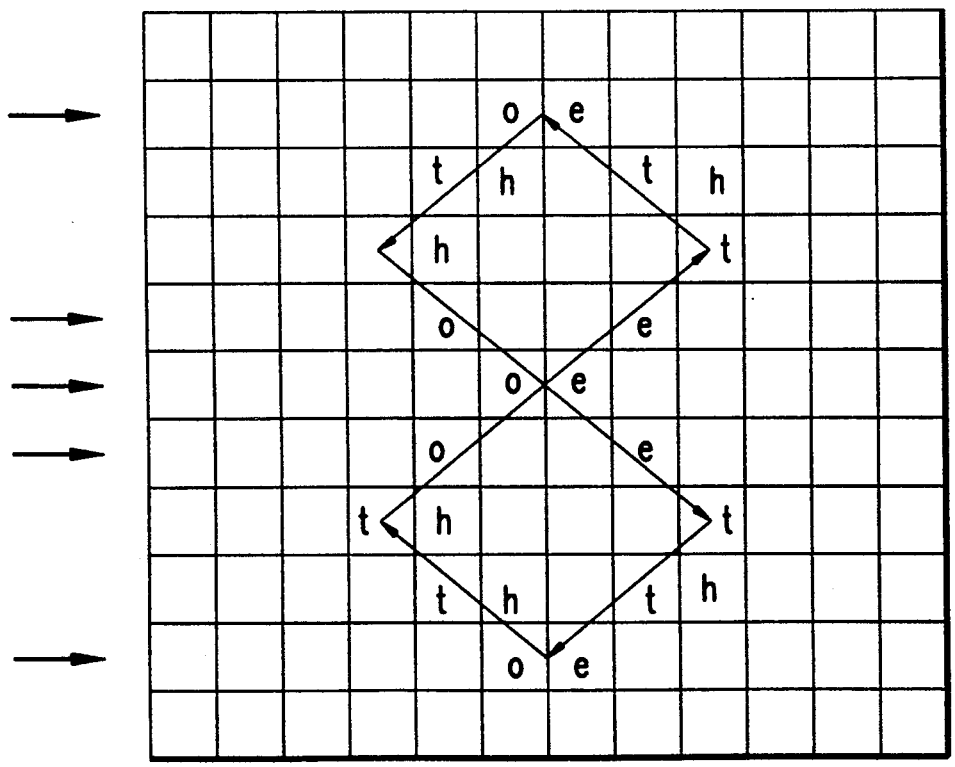
FIG. 16 illustrates examination of special scanlines for odd and even edges.

In phase two, the actual behavior of the polygon is determined for those special scanlines discovered in phase one. The phase comprises stepping through the array of scanline flags, and processing those scanlines with corresponding flags set to true. On each such scanline, the pixels from left to right are stepped through in a search for "temporary" entries. These entries are changed to indicate where the corresponding edge is "odd" or "even" numbered. Thus, the "temporary"

state is changed to either an "odd" or "even" state. This appears to require two additional states, but actually the same state values used for "temporary" and "horizontal" can be used for "odd" and "even" (only the interpretation changes). If the same states are used in both cases, then in addition to replacing the temporary entries, the "horizontal" entries must also be removed on the special scanlines. The description will continue to refer to the replaced "temporary" values on special scanlines as "odd" and "even" for clarity, even though "odd" may be identical to "temporary", and "even" identical to "horizontal". It will be clear how to interpret the state after the phase-two processing by whether or not the scanline is marked as special. When all flags have been examined and special scanlines have been processed, phase two is complete as shown in FIG. 16.

PHASE III

The third and final phase comprises replacing the temporary entries with the permanent "up" or "down" states. To do this, polygon edges are stepped through a second time, determining the pixels affected. In this phase, the pixels along the polygon boundary will be changed to match a current state parameter which will take on the values of "up" or "down". The processing of the pixel depends on whether or not it lies on a special scanline. Consider first the processing on special scanlines. In phase two, the "temporary" entries on special scanlines were converted to "odd" or "even" entries, and "horizontal" entries were removed. If the scanline is special, the pixel is first examined to see if its state is "odd" or "even". If it is "odd", the current state to be stored is set to "down". If it is "even", the current state to be stored is set to "up". The "odd" or "even" entry is then replaced with the current state to be stored. Whenever a special scanline is encountered, its contents are examined to find the proper "up" or "down" direction, thereby accommodating any change in edge direction.

On non-special scanlines, the "temporary" entry is just replaced with the current state to be stored. Thus, we step along the edge, replacing "temporary" values with either "up" or "down" states (whichever is the current state to be stored). The pixels corresponding to "horizontal" entries will be examined on non-special scanlines. The pixels corresponding to "horizontal" states will be removed. The pixel must be checked before removing the "horizontal" states because the entry may have already been removed by a touching edge. The "horizontal" entries need not be checked on special scanlines if they were removed as part of the phase-two processing.

Figure 17:
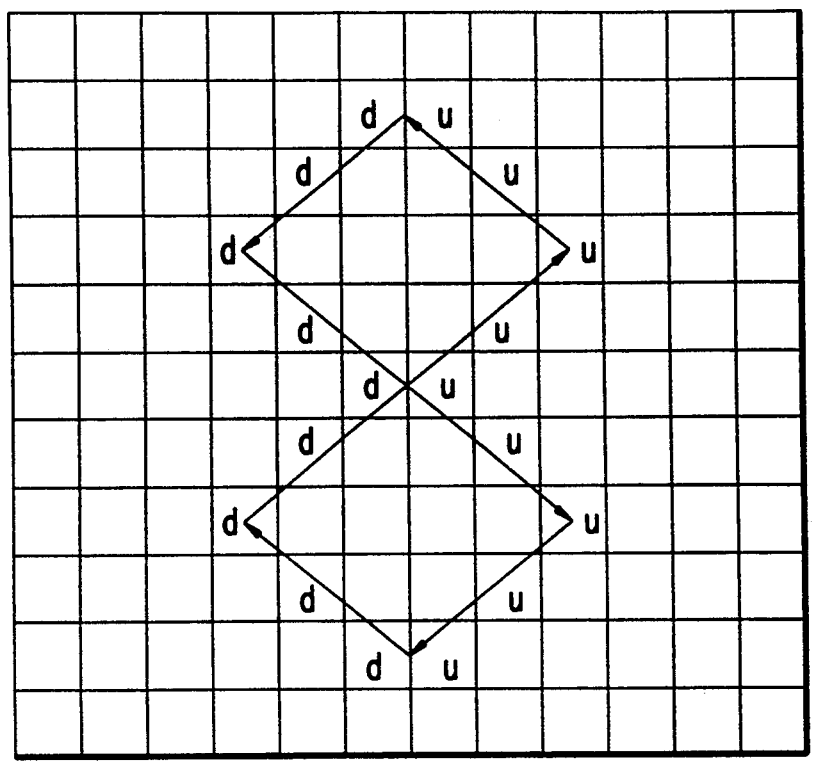
FIG. 17 illustrates the final conversion to nonzero winding number convention.

When all edges have been considered, phase three is complete and the polygon is in its final non-zero winding number form as shown in FIG. 17.

Figure 18:
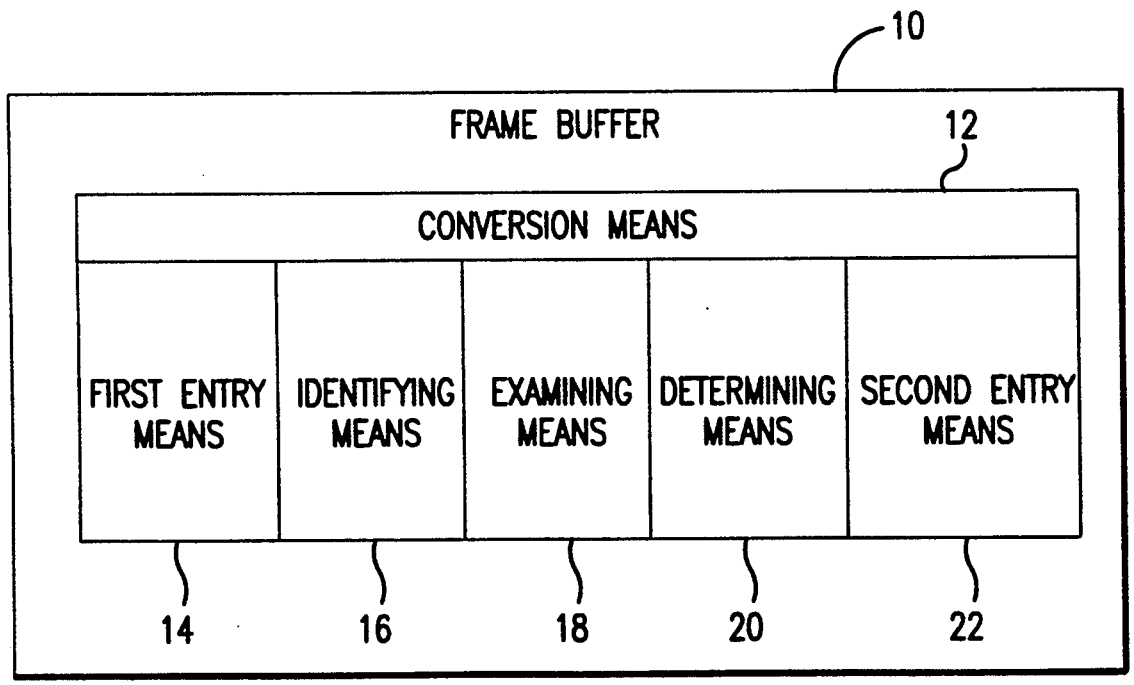
FIG. 18 is a block diagram of a frame buffer which can be used to perform the conversion.

FIG. 18 is a block diagram of a frame buffer 10 which can be used to perform the above-described conversion. Frame buffer 10 includes conversion means 12. Conversion means 12 includes first entry means 14 which enters a boundary shape of a polygon into frame buffer 10 using a distinguished state for pixel settings. Identifying means 16 identifies special scanlines such as relative maxima and minima and where the polygon might touch itself on which a direction number change might take place in the non-zero winding number convention. Examining means 18 examines the identified scanlines. Determining means 20 determines the precise behavior of the boundary shape. Second entry means 22 enters the boundary shape by replacing the distinguished pixel states with states normally used for describing objects with a non-zero winding number.

The above-described conversion allows polygons originally defined by an odd winding number to now be defined by a non-zero winding number. The conversion could be used in conjunction with conventional graphics systems. The extended frame buffer can be used to hold polygons and their generalizations, with interiors originally defined by an odd winding number. This is done by converting from an odd winding number to a non-zero winding number definition. The conversion can take place in the extended frame buffer with the addition of two states. The cost of the conversion is roughly twice the cost of the entry of a non-zero winding number polygon since its perimeter must be traversed twice, and special scanlines are normally rare. The conversion does not require any sorting of edges or subdividing at extreme points. It does not require an analytic description of an edge, nor the ability to calculate edge intersections. It requires only that the extended frame buffer support two additional states.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

I claim:

1. A method of representing a polygon in a graphics system by converting an odd-winding number convention to a non-zero winding number convention, the method comprising the steps of:

storing a boundary shape of a polygon in a buffer of the graphics system using a distinguished state of pixel settings according to an odd-winning number convention;

identifying and marking special scanlines on which at least a direction number change would take place in a non-zero winding number convention;

examining the identified special scanlines;

determining precise changes in edge directions of the boundary shape;

replacing the distinguished pixel states stored in the buffer with permanent states used for representing polygons with a non-zero winding number, the permanent states entered for scanlines other than the special scanlines corresponding to current direction value states and the permanent states entered for the special scanlines corresponding to entries on the special scanlines; and representing the polygon in the graphics system in accordance with the permanent states that replace the distinguished states in the replacing step.

2. The method as recited in claim 1, wherein the step of identifying special scanlines includes identifying scanlines where there are relative maxima, relative minima and where the polygon is self-intersecting.

3. A graphics apparatus incorporating a frame buffer, said apparatus representing a polygon by converting an odd winding number convention to a non-zero winding number convention, comprising:

first entry means for entering a boundary shape of a polygon into a frame buffer using a distinguished state for pixel settings according to an odd-winding number convention;

identifying means for identifying and marking special scanlines on which a direction number change would take place in a non-zero winding number convention;

examining means for examining the identified special scanlines;

determining means for determining precise changes in edge directions of the boundary shape; and second entry means for entering the boundary shape by replacing the distinguished pixel states with permanent states normally used for describing objects with a non-zero winding number, the permanent states entered for scanlines other than the special scanlines corresponding to current direction value states and the permanent states entered for the special scanlines corresponding to the entries on the special scanlines;

representing means for representing the boundary shape entered by the second entry means using the non-zero winding number states in the graphic apparatus.

4. The apparatus as recited in claim 3, wherein:

said identifying means identifies scanlines where the are relative maxima, relative minima and where the polygon is self-intersecting.

* * * * *